United States Patent [19]

Zegarski

[11] Patent Number: 4,674,873

[45] Date of Patent: Jun. 23, 1987

[54] SATELLITE LOCATOR APPARATUS

[76] Inventor: Anthony J. Zegarski, P.O. Box 55, Stowe, Vt. 05672

[21] Appl. No.: 651,084

[22] Filed: Sep. 17, 1984

[51] Int. Cl.$^4$ .......................... G01B 11/26; G01C 1/00
[52] U.S. Cl. ..................................... 356/138; 356/140; 356/147
[58] Field of Search ............... 356/139, 140, 142, 143, 356/147, 148, 248, 249, 138

[56] References Cited

U.S. PATENT DOCUMENTS 1,875,829  9/1932  Suverkrop ........................... 356/143

Primary Examiner—F. L. Evans
Attorney, Agent, or Firm—Thomas N. Neiman

[57] ABSTRACT

The satellite locator means comprises a dual optical instrument which provides a portable, multiple eyepiece unit containing a plurality of lenses and mirrors. The outer housing has a handle to insure the steadiness and accuracy of the readings when the unit is being used. One eyepiece has a magnifying lens which views a magnetic compass and a bubble level. Another eyepiece contains a lens system which includes a crosshair to aid in the accuracy of the unit. The second eyepiece views an adjustable mirror controlled by an elevational setting system, operated by a cam linkage assembly.

4 Claims, 5 Drawing Figures

SATELLITE LOCATOR APPARATUS

This invention pertains to optical instruments, and in particular to means for locating microwave communications satellites that are positioned in a geosynchronous orbit around the earth. The necessity for unobstructed line of sight view is required for proper reception or transmission of a dish antenna with the satellite.

In the prior art it is typical for satellite antenna dish installers to use a direction finding compass and a protractor or similar device to provide a crude, nonspecific method which results in much inaccuracy and excessive amount of time required to provide a satisfactory result. Devices showing optical devices used for triangulation are shown, for instance, in U.S. Pat. No. 3,876,212, issued Sept. 11, 1973 to T. F. Messler, for a Hand Held Optical Triangulation Position-Determining Instrument, and in the U.S. Pat. No. 2,953,060 issued Sept. 20, 1960 to V. E. Carbonara, for a Pocket Transit.

As is shown in these patents, these devices are hand held units which allow the user to view a compass and a distant point and where one of the reflectors is adjustable. In such prior art arrangements it has been typical and necessary of course, for the user to view the distant point and then examine the magnetic heading. This results in slight errors in the measurements due to slight movements that the user may make.

What is needed is a simplified device which, at the same time, allows the user to view a specific field while maintaining the desired bearing. Accordingly, it is an object of this invention to set forth satellite locating means which simplifies the requirements for providing an accurate measurement. It is another object of this invention to disclose such satellite locating means to allow the observor to see any terrestial obstructions that would interrupt the communication.

It is a particular object of this invention to teach, satellite locator means, for determining an obstacle free line of sight from an antenna or the like to a satellite, comprising means defining a housing in which to place optical equipment, support means, optical means, means for determining a desired azimuth, means connected to said azimuth determining means for assisting the maintenance of a level horizontal plane, and elevation setting means.

Further objects and features of this invention will become more apparent by reference to the following description, taken in conjunction with the accompanying figures in which.

Figure 1:
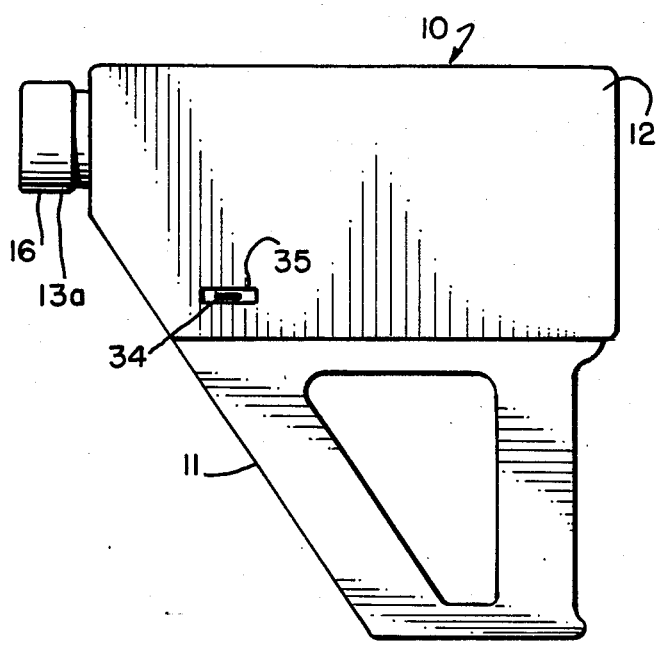
FIG. 1 is a right side view of the novel satellite locator means.
Figure 2:
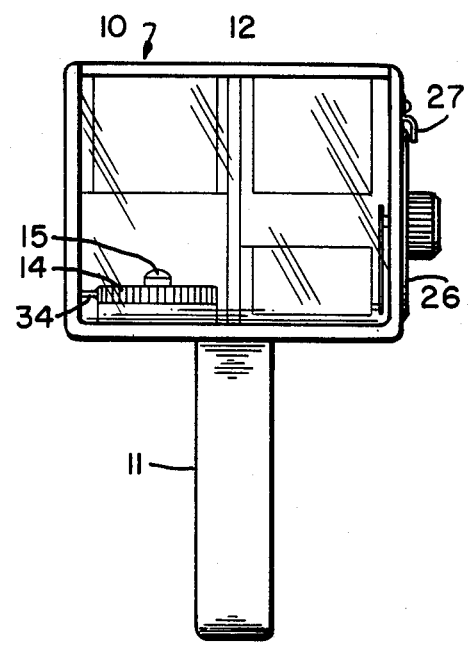
FIG. 2 is a front view thereof.
Figure 3:
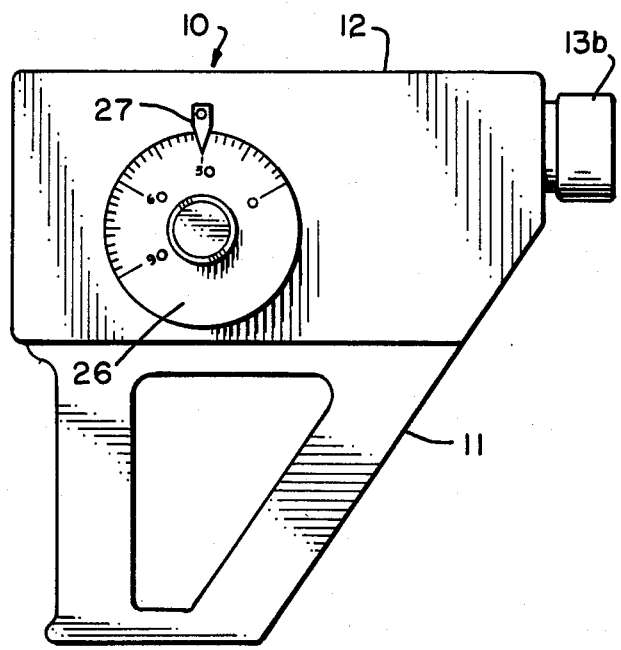
FIG. 3 is a left side view thereof.
Figure 4:
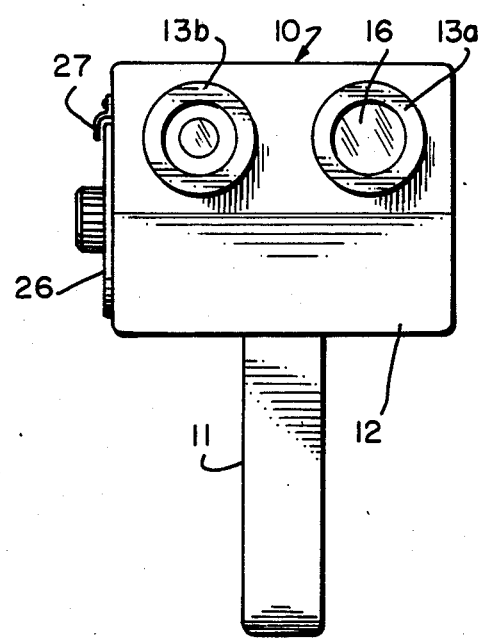
FIG. 4 is a rear view.
Figure 5:
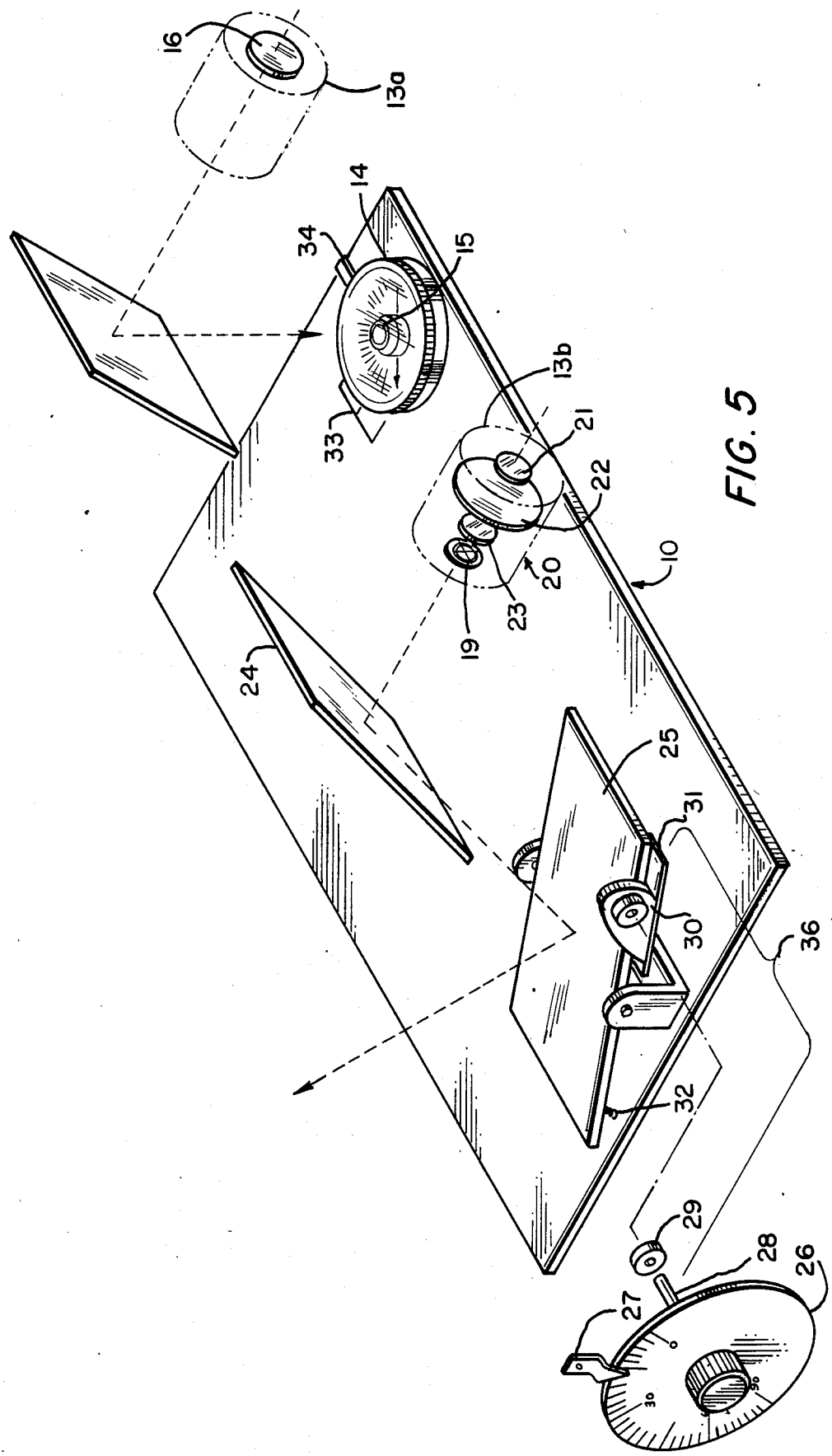
FIG. 5 is side-elevational, enlarged, exploded internal view of the novel satellite locator means.

As shown in the figures, the satellite locator device 10 is composed of a support handle 11, a protective shell 12, and binocular eyepieces 13a and b. The right eyepiece 13a views a magnetic directional compass 14 and a bubble level 15 through a magnifying lens 16 and mirror 17.

The left eyepiece 13b views the outside target area through cross hairs reticle 19 for exact location of the satellite. The left eyepiece 13b has a multi-port assembly 20 which comprises the crosshair reticle 19, lenses 21 and 22, and a reticle lens 23. The viewer looks through the assembly 20 to a fixed mirror 24 and then an adjustable mirror 25 controlled by an elevational setting dial 26 through a cam linkage assembly 36.

The dial 26 is calibrated so that the user can set a desired elevation to be viewed under the pointer 27. The cam linkage assembly 36 is formed by a rod 28 which supports and rotates a spacer 29 and cam 30. The cam 30 contacts the cam slide 31 which will then move the adjustable mirror 25 to the desired position is attained and the proper elevation is being viewed. A tension spring 32 keeps the mirror 25 from oscilating or over rotating.

In use, the satellite locator device 10 is picked up by the operator who had previously determined the exact azimuth and elevation coordinates for the satellite to be located. The desired elevational setting is dialed on the elevational setting dial. This action adjusts the angle of the adjustable mirror 25 so that the operator will have a line of site view from the antenna installation site to the desired satellite. This will enable the operator to determine whether any obstacles exist, which would interfere with satellite reception or antenna transmission to the satellite.

The operator then stands at the location of the antenna site and looks into eyepieces 13a and b. In the right eyepiece 13a, he views the level bubble 15 and levels the device 10. He reads the azimuth on the magnetic directional compass 14. The operator can use the fixed indicator line 33 and the small set handle 34, accessable through slot 35, to adjust the compass 14 to compensate for the true north/magnetic north deviation. He slowly rotates around until the desired magnetic heading is reached. At that point he views the line of sight through the left eyepiece 13b. An immediate determination can then be made whether any obstacle would negate installation of the antenna at that specific location.

While I have described the invention in connection with a specific embodiment thereof, it is to be understood that this is done only by way of example, and not as a limitation to the scope of my invention as set forth in the objects thereof and in the accompanying claims.

I claim:

1. Satellite locator means, for determining an obstacle free line of sight from antenna or the like to a satellite, comprising:

means defining a housing for which to encompass and hold sighting and orientation equipment;

support means attached to the base of said housing for enabling the user to said housing in a desired position;

optical means positioned at the rear of said housing to permit the viewing of directional, plane and external positions:

said optical means comprises first and second means located on the rear wall of said housing;

means for determining a desired azimuth located within said housing;

said azimuth determining means comprises a magnetic compass located within said housing;

level means attached to said azimuth determining means within said housing to allow the maintenance of a horizontal plane;

said azimuth determining means and said level means are observed through said first means;

elevation viewing means located within said housing;

said elevation means being observed by said second means;

said said elevation means has means for presetting the angle of elevation to be viewed;

said presetting means has elevation identification means;

said presetting means has means for changing the setting;

said changing means comprises an adjustable reflector located within said housing;

said adjustable reflector has a cam link assembly; and said assembly maintains frictional contact with said reflector.

2. Satellite locator means, according to claim 1, wherein:

said azimuth determining means has enlarging means for ease of reading said azimuth.

3. Satellite locator means, according to claim 1, wherein:

said azimuth determining means has means for adjusting said azimuth for the divergence of true north and magnetic north at a particular location.

4. Satellite locator means, according to claim 1, wherein:

said horizontal assisting means comprises a liquid and air level means.

* * * * *